United States Patent Office 3,028,749
Patented Apr. 10, 1962

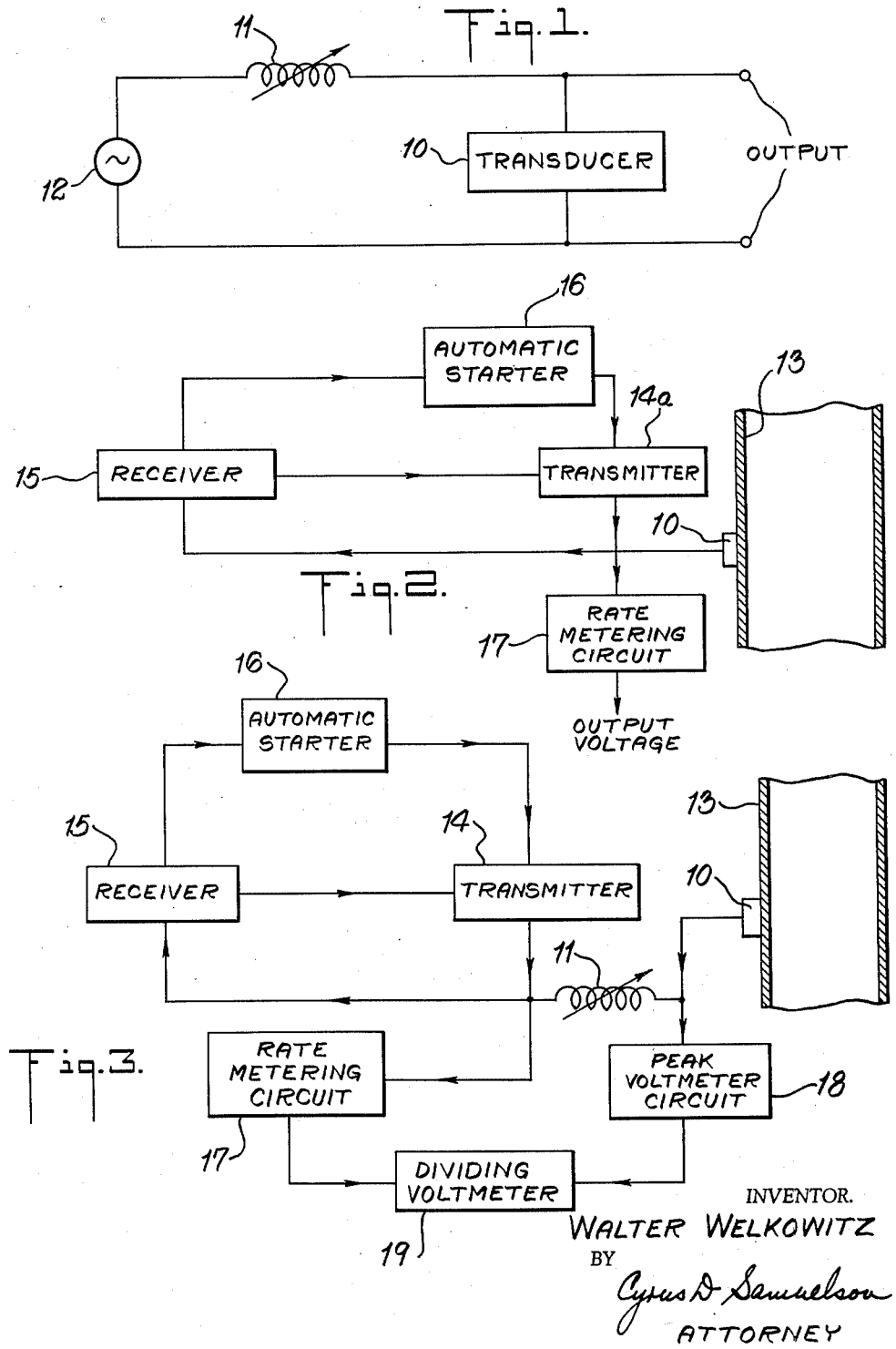

3,028,749
ULTRASONIC FLUID DENSITY MEASURING SYSTEM
Walter Welkowitz, Nixon, N.J., assignor to Gulton Industries, Inc., Metuchen, N.J., a corporation of New Jersey
Filed Jan. 26, 1959, Ser. No. 788,947
3 Claims. (Cl. 73—32)

My invention relates to ultrasonic fluid density measuring systems and in particular to those systems which are not temperature dependent.

The density of fluids may be obtained acoustically by measuring the acoustic impedance of the fluid system. The disadvantage of such a method is that the measurements obtained are temperature dependent because the term involving the sound velocity is temperature dependent. It is an important object of this invention to overcome this disadvantage by providing a system wherein the sound velocity is also measured and the measured impedance value is divided by the sound velocity. The resulting value is a measure of the fluid density which is independent of the sound velocity.

A further object of my invention is to provide such a system which is simple to operate, maintain and produce.

These and other objects, advantages and features will be apparent during the course of the following description when taken in conjunction with the accompanying drawings wherein:

FIGURE 1 is a block schematic diagram of an ultrasonic system for measuring the acoustic impedance of the fluid, FIGURE 2 is a block schematic diagram of an ultrasonic system for measuring the velocity of sound in the fluid, and FIGURE 3 is a block schematic diagram of an ultrasonic system for measuring the density of the fluid by combining the systems of FIGURES 1 and 2.

In the drawings, wherein, for the purpose of illustration, is shown a preferred embodiment of my invention, the numeral 10 designates a transducer for generating mechanical vibrations in response to an energizing voltage applied thereto. It may be of any piezoelectric material, but I prefer to utilize the ferroelectric ceramics such as barium titanate, lead titanate-zirconate or any other such ceramic material with or without additives. In FIG. 1, a variable inductance 11 is shown connected in series between voltage generator 12 and transducer 10 and is adjusted so that its reactance is equal to and opposite in sign to the clamped capacitive reactance of transducer 10 at the frequency of mechanical resonance of the transducer. Generator 12 is an ultrasonic signal voltage generator of a frequency of the order of, for example, one megacycle per second and a constant output voltage amplitude of the order of 100 volts. Transducer 10 is affixed to fluid container 13 which may be a pipe, tank or other container for the fluid whose density is to be measured.

Transmitter 14a in FIGURE 2 is a voltage pulse transmitter with a fundamental frequency of, for example, one megacycle per second and a maximum pulse rate of approximately 10,000 pulses per second such as has been described in patent application Serial No. 653,675 for Ultrasonic Liquid Level Gauge which I made jointly with Hugo E. Dahlke. Receiver 15 includes a tuned amplifier and is adapted to respond to the voltage generated by the reception by the transducer 10 of mechanical echo vibration pulsations reflected by the pipe walls. The mechanical vibration pulsations thus traverse a fixed path length. The output of the receiver 15 is connected to transmitter 14a so that transmitter 14a generates a pulse each time receiver 15 senses a voltage indicating the reception of an echo pulse by the transducer 10. Automatic starter 16 is provided to start transmitter 14a whenever an echo indicating voltage is not sensed by the receiver 15. It is not activated unless there is a reasonably long period of no-signal. Rate metering circuit 17 measures the rate of generation of voltage pulses by transmitter 14a and translates this pulse rate into an output voltage proportional thereto. Rate metering circuit 17 is of the type such as has been described in the aforementioned joint application of Hugo E. Dahlke and me. This application also discloses the circuitry for the various electrical components shown in FIG. 2.

In FIGURE 3, the systems of FIGS. 1 and 2 have been combined to form an integrated system. The transmitter 14 is similar to transmitter 14a of FIGURE 2 and it maintains a constant output voltage amplitude similar to that of generator 12 of FIGURE 1. Peak voltmeter circuit 18 is of the type such as has been described in the Radiotron Designer's Handbook at page 119 and serves to measure the voltage across transducer 10. Variable inductance 11, as in FIG. 1, is connected between the transmitter 14 and transducer 10. Dividing voltmeter 19 is of the type such as is supplied by Edison Electric Co. (Model Number 222–IJ) and it serves to divide a voltage, which is proportional to fluid density multiplied by acoustic velocity ($\rho c$), by a voltage which is proportional to the velocity ($c$) of the mechanical vibrations in the fluid involved, thereby making its output display a measure of the density ($\rho$).

Broadly, my invention relates to the measurement of the density of the fluid in a closed system by measuring the acoustic impedance of the fluid in the system. This approach has an inherent disadvantage, in that, the results obtained are temperature dependent. This is due to the fact that the term involving sound velocity is temperature dependent. On the other hand, if a simultaneous measurement of the sound velocity is made when the acoustic impedance is measured, the impedance value may be divided by the sound velocity, leaving a value of density which is independent of sound velocity and therefore of temperature.

Referring once again to FIG. 1, it will be noted that the constant output voltage from voltage generator 12 is applied to transducer 10 through variable inductance 11 which is tuned to resonance with the clamped capacitive reactance of transducer 10. When this occurs, the voltage across the transducer 10 is proportional to the acoustic impedance of the fluid into which the sound waves are propagated. The acoustic impedance, in turn, is proportional to the quantity $\rho c$ above mentioned.

In FIG. 2 (and FIG. 3) the repetition rate of the transmitter 14a (and 14) is a measure of the sound velocity ($c$) in the fluid and so the higher the repetition rate, the higher is the sound velocity. As previously indicated, the rate metering circuit 17 serves to produce an output voltage which is proportional to the repetition rate and therefore to the sound velocity ($c$) in the fluid.

In the combined system of FIGURE 3, the density of the fluid is measured by the dividing voltmeter 19 which divides the output of the peak voltmeter circuit 18 which is proportional to the acoustic impedance by the voltage output of the rate metering circuit 17 which is proportional to the sound velocity, to thereby obtain a reading which indicates the fluid density. The voltmeter 19 can be calibrated directly in density units.

While I have disclosed my invention in relation to a specific example and in a specific embodiment, I do not wish to be limited thereto, for obvious modifications will occur to those skilled in the art without departing from the spirit and scope of my invention.

Having thus described my invention, I claim:

1. An ultrasonic fluid density measuring system comprising container means for containing the fluid whose density is being measured, transducer means including a capacitive transmitting transducer affixed to said container means for transmitting and receiving mechanical vibrations in said fluid over a fixed path length, the received vibrations generating a voltage in said transducer means, an inductance connected to said transmitting transducer and adjusted so its reactance is equal to the clamped capacitive reactance of said transmitting transducer and opposite in sign thereto at the mechanical resonance of the transducer, pulse transmitting means having a constant output voltage amplitude connected to said inductance to couple energizing voltage pulses through said inductance to said transmitting transducer and energize the same to provide mechanical vibration pulsations in said fluid traversing said fixed path length, receiving means coupled to said transducer means to receive the voltage generated by said transducer means in response to the received vibrations, said receiving means being connected to said transmitting means to trigger the same into operation each time a pulse is received by said receiving means to provide a pulse repetition rate proportional to the traverse time of the mechanical vibration pulsation along said fixed path length, first measuring means for measuring the voltage across said transmitting transducer, second measuring means for measuring the pulse rate output of said transmitting means, and means responsive both to said first and second measuring means for providing an indication of the density of the fluid.

2. An ultrasonic fluid density measuring system as described in claim 1 including means for starting the transmitting means automatically when no echo pulsation is sensed by said receiving means.

3. An ultrasonic fluid density measuring system as described in claim 1 wherein said last-mentioned means includes dividing means responsive to said first and second measuring means for providing an indication of the value of the voltage across said transmitting transducer divided by the pulse rate of the output of said transmitting means.

References Cited in the file of this patent

UNITED STATES PATENTS

| 2,869,357 | Kritz | Jan. 20, 1959 |
| 2,889,705 | Hanysz et al. | June 9, 1959 |
| 2,926,522 | Kritz | Mar. 1, 1960 |

FOREIGN PATENTS

| 1,128,966 | France | Jan. 14, 1957 |